H. TIDOW.
COOKING UTENSIL.
APPLICATION FILED APR. 23, 1908.
902,181.
Patented Oct. 27, 1908.
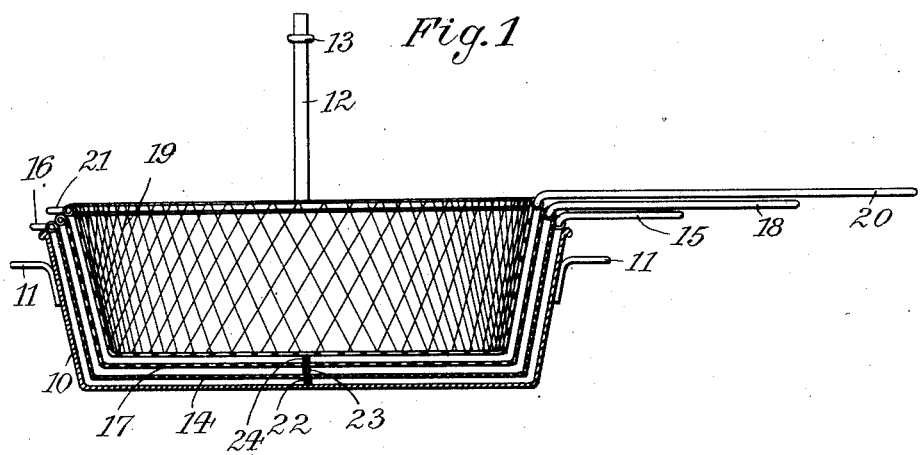
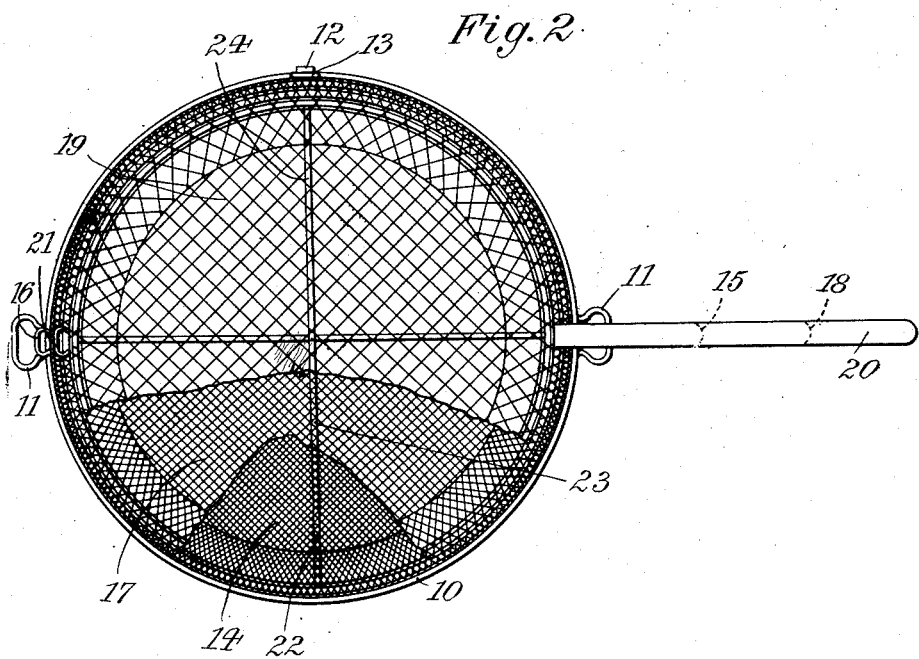
Witnesses:
Arthur E. Gumpe
W. R. Schulz
Inventor
Hugo Tidow
By his Attorney

UNITED STATES PATENT OFFICE.

HUGO TIDOW, OF NEW YORK, N. Y.

COOKING UTENSIL.

No. 902,181.

Specification of Letters Patent.

Patented Oct. 27, 1908.

Application filed April 23, 1908. Serial No. 428,805.

*To all whom it may concern:*

Be it known that I, HUGO TIDOW, a citizen of Germany, residing at New York city, Manhattan, county and State of New York, have invented new and useful Improvements in Cooking Utensils, of which the following is a specification.

This invention relates to a cooking utensil more particularly designed for frying food in grease. This food, comprising such articles as croquettes, cutlets, oysters, fritters, etc., is frequently breaded before being fried in the grease, and the object of the invention is to retain the grease in a pure state, free from bread crumbs and other particles that may be separated during the frying operation.

In the accompanying drawing: Figure 1 is a vertical longitudinal section of my improved cooking utensil, and Fig. 2 a plan, partly in section, thereof.

A frying pot 10, having handles 11, is provided with a drip post 12 having lug 13. Within pan 10 is removably hung a fine meshed strainer 14 composed of wire gauze secured to a suitable frame. This strainer is provided with a laterally extending handle 15 and with an eye 16 opposite the handle. Within strainer 14 is nested a second similar strainer 17 which is somewhat wider meshed and is provided with laterally extending handle 18. Within strainer 17 is nested a third similar strainer 19, which constitutes a frying basket, and is wider meshed than strainer 17. This frying basket is provided with a laterally extending handle 20 and an eye 21 by which it may be suspended from post 12, whenever desired. In each of the strainers 14, 17, 19, the sides, as well as the bottom, are composed of wire gauze.

Strainer 14 is spaced at its bottom and sides from pot 10; strainer 17 is similarly spaced from strainer 14, and frying basket 19 is similarly spaced from strainer 17. The bottom spacing is accomplished by providing each strainer 14, 17, 19, with a downwardly extending frame or rib, 22, 23, 24, secured to the lower side of the bottom of said strainer and adapted to rest upon the bottom next below to prevent sagging.

Handles 15, 18, 20 are so correlated that they may be grasped either singly or collectively. Thus, as shown, handle 18 is somewhat longer than handle 15, while handle 20 is again longer than handle 18.

In use, the food is placed into basket 19 and the latter, together with strainers 14, 17, is hung into grease pot 10. After the frying operation has been completed, basket 19, containing the fried food is lifted out with one hand, while strainers 14, 17 are simultaneously lifted out with the other hand and are suspended on drip post 12. These strainers will now contain all the crumbs and other particles separated from the food, so that the grease will remain entirely clear and in good condition for the next frying operation. The coarser particles separated will be entrapped in strainer 17, while the finer particles will be caught up by strainer 14, so that neither strainer is apt to become clogged and each may be readily relieved of its contents, by dumping. If desired, basket 19 may be lifted simultaneously with strainer 17, or with both strainers 17 and 14, by grasping the handles either individually or collectively at different distances from their base.

It will be seen that by my invention the grease is not polluted during the frying operation, so that the same grease pot may be used for successively frying different kinds of food. In this way the necessity of using a number of grease pots for different foods is obviated and a cleanly and wholesome meal is insured.

I claim:

A cooking utensil, comprising a pot, a first fine meshed strainer hung therein, a second wider meshed strainer hung in the first strainer, and a still wider meshed frying basket hung in the second strainer, the strainers and frying basket being composed of wire gauze at the sides and bottom, combined with means for spacing said strainers and frying basket, substantially as specified.

Signed by me at New York city, (Manhattan,) N. Y., this 22nd day of April, 1908.

HUGO TIDOW.

Witnesses:
 N. R. SCHULZ,
 FRANK V. BRIESEN.